Figure 1:
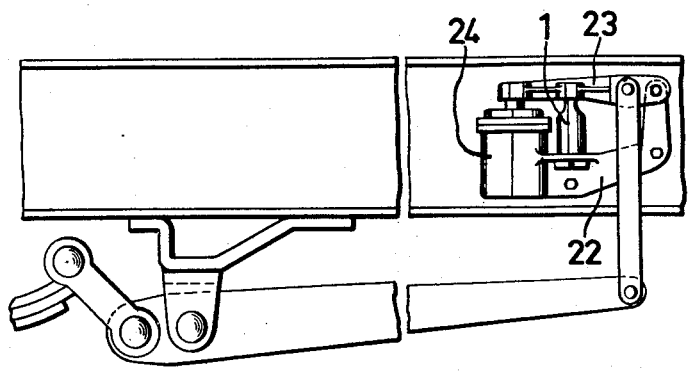

July 11, 1961   I. V. LARSSON   2,991,801
CONTROL VALVE
Filed Dec. 24, 1958

United States Patent Office 2,991,801
Patented July 11, 1961

2,991,801
CONTROL VALVE
Ingmar Valentin Larsson, Malmo, Sweden, assignor to Svenska Aktiebolaget Bromsregulator, Malmo, Sweden, a corporation of Sweden
Filed Dec. 24, 1958, Ser. No. 782,892
4 Claims. (Cl. 137—620)

This invention relates to a control valve for a fluid pressure operated servomotor in fluid pressure brake systems for vehicles, particularly railway vehicles.

The control valve to which the invention relates is for use in fluid pressure brake systems for railway and like vehicles of the kind having on the individual vehicle a member to be set into one or the other of two definite positions for conditioning the brake on the vehicle for a lower or a higher braking effort, means urging said member towards and normally holding it in one of its said two definite positions, a servomotor operable by fluid pressure under the control of the control valve for moving said member into and holding it in the other of said two definite positions, and means operating automatically under the influence of the load of the vehicle for controlling the control valve. A fluid pressure brake system of this kind is disclosed in the U.S. Patent No. 2,424,913.

In the said U.S. Patent No. 2,424,913 it is proposed to connect the control valve operated in response to the vehicle load in a pressure fluid supply conduit for the servomotor connecting the servomotor to a point of the brake system which is set under fluid pressure immediately at the beginning of an application of the brake and from which the fluid pressure is removed (vented to atmosphere) when the brake is released. The present invention, however, is concerned with a situation which is not present in the said prior proposal and arises when it is desired to provide the control valve operated in response to the vehicle load in a pressure fluid supply conduit for the servomotor connecting the servomotor to a point of the brake system which is under fluid pressure not only during braking but also when the brake is released. Such a point is for instance the auxiliary air container in a compressed air brake, and especially in certain modern compressed air brake systems in which there is no easily accessible point which is set under compressed air pressure immediately at the beginning of an application of the brake and from which the compressed air pressure is removed when the brake is released, it is desirable to connect the compressed air supply conduit for the servomotor to the auxiliary air container of the brake system. This implies that the venting of the servomotor to atmosphere cannot be effected simply by a one-way valve in the pressure fluid supply conduit for the servomotor as in the prior proposal above referred to and that the control valve operated in response to the vehicle load has to be constructed as a three-way valve which is movable into one or the other of two definite positions and in one of these positions connects the servomotor to the source of compressed air (say to the auxiliary air container) and in the other position vents the servomotor to atmosphere.

The object of the invention is to provide such a three-way control valve which is movable into one or the other of said two definite positions under the influence of the vehicle load reposing on the vehicle springs and which while of a relatively simple construction functions in a safe and satisfactory manner.

One special object of the invention is to safeguard by the construction of the control valve against undesirable movements of the control valve under the influence of the dynamic fluctuations of the load reposing on the springs of the vehicle during running.

For the above objects and for such further objects as may appear from the following description of a preferred form of the control valve, the invention consists in the organization, combination and construction of parts set forth in the appendant claims.

Figure 2:
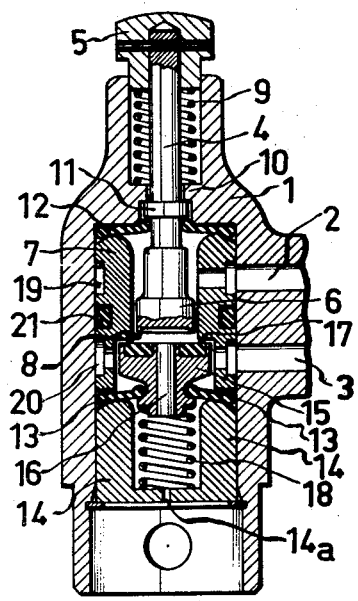
Figure 3:
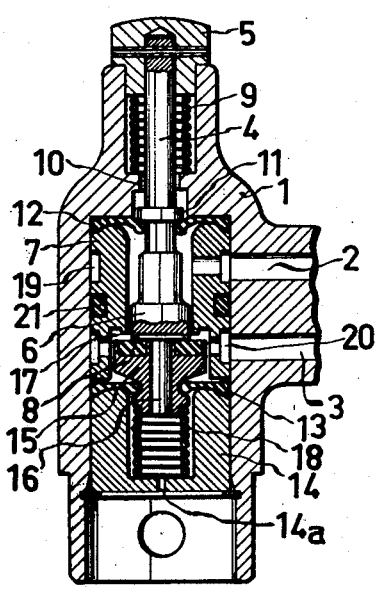

The preferred form of the control valve is illustrated on the accompanying drawings in which:

FIG. 1 is a fragmental side view of a railway vehicle and illustrates an arrangement of the control valve, and FIGS. 2 and 3 are axial sections of the control valve in one and the other, respectively, of its two definite end positions into which it is movable under the control of the load reposing on the vehicle springs.

The control valve comprises a valve housing 1 with ports 2 and 3. The upper port 2 is to be connected with the fluid pressure operated servomotor which latter may be of any known or other suitable construction and does not form part of the present invention and is not shown or described in detail herein. The lower port 3 is to be connected with the source of pressure fluid. Guided in the valve housing 1 is a valve stem 4 which projects upwardly through the neck-shaped upper portion of the valve housing 1 and is provided on its projecting upper end with a head 5. The valve stem 4 has an enlarged lower end portion 6 which is movable in a hollow cylindrical insert 7 in the valve housing 1 and is provided with a projecting annular edge or ridge 8 on its lower end face at the periphery thereof. Between the head 5 on the projecting upper end of the valve stem 4 and the housing 1 there is inserted a coiled compression spring 9 which is disposed around the valve stem 4 in the neck-shaped upper portion of the valve housing 1 and urges the valve stem 4 into its upper end position which is shown in FIG. 2 and is defined by coacting abutments formed by a shoulder 10 in the housing 1 and a flange 11 on the valve stem 4. The space within the cylindrical insert 7 is closed at its upper end by a diaphragm 12 fitted sealingly around the valve stem 4 under and close to the flange 11 and clamped sealingly at its outer periphery between the upper end of the insert 7 and the housing 1. The lower portion of the space within the insert 7 is enlarged and closed at its lower end by a diaphragm 13 which is clamped sealingly at its outer periphery between the insert 7 and a cup-shaped bottom plug 14 inserted into the valve housing 1 through the open lower end thereof and locked in place. The diaphragm 13 is fitted sealingly around a valve member 15 movably disposed in the internally enlarged lower portion of the insert 7. This valve member 15 is provided with an axial through-hole 16 which is in communication with atmosphere through a relatively restricted hole 14a in the bottom of the cup-shaped bottom plug 14. The enlarged lower end portion 6 of the valve stem 4 serves as a valve member for shutting off the through-hole 16 in the valve member 15 by the projecting edge or ridge 8 coacting with the upper end face of the valve member 15. The upper end face of the valve member 15 may be of rubber or similar material. With its said upper face the valve member 15 coacts also with a projecting annular edge or ridge 17 at the inner periphery of the ledge formed between the lower portion of relatively enlarged inner diameter and the upper portion of relatively reduced inner diameter of the insert 7 for shutting off the upper and lower portions of the space within the insert 7 from communication with one another. A coiled compression spring 18 inserted between the valve member 15 and the bottom plug 14 urges the valve member 15 with the upper end face thereof up against the projecting annular edge or ridge 17.

In its outer circumference the insert 7 is provided with an annular groove 19 in communication with the port 2, and with an annular groove 20 in communication with the port 3. For sealing the insert 7 against the housing 1 between the two annular grooves 19 and 20 the insert 7 is provided in its outer circumference between the two grooves 19 and 20 with a third annular groove accommodating a sealing means, preferably a so called O-ring 21. The groove 19 communicates with the upper portion of relatively reduced diameter of the interior of the insert 7, and the groove 20 communicates with the lower portion of relatively enlarged diameter of the interior of the insert 7, in which latter portion the valve member 15 is disposed.

In the arrangement of the control valve shown in FIG. 1 the valve housing 1 is mounted with its lower end in a bracket 22 mounted on one of the longitudinal beams of the underframe of a railway car. To the same bracket 22 there is fulcrumed a valve operating lever 23 acted upon by a force derived from and varying proportionally to the load reposing on the vehicle springs. The mechanism deriving this force from the vehicle spring pressure and transmitting it in the form of a downward pull onto the valve operating lever 23 may be of any known or other suitable construction and does not form part of the present invention and will therefore not be described herein. Under the action of said downward pull the valve operating lever 23 bears against the upwardly projecting end of the piston rod of the piston in a dash pot 24 in which the piston is supported by a spring urging the piston upwardly. This dash pot and its use for yieldingly supporting a control valve operating lever such as the lever 23, and for damping the movements of this lever, is well known in the art and does not form part of the present invention and will therefore not be described in detail herein. It may be said, however, that the cylinder of the dash pot 24 preferably is made integral with the bracket 22.

The operation of the shown and described servomotor control valve is as follows.

When on loading of the vehicle the load reposing on the vehicle springs has been increased to a value at which the downward pull acting on the valve operating lever 23 begins to overcome the action of the spring in the dash pot 24 further increase of the vehicle load will cause the spring in the dash pot to yield and permit the lever 23 to turn downwardly and engage the head 5 of the valve stem 4 and depress the latter until it reaches its lower end position which is defined by the head 5 bearing against the valve housing 1 as shown in FIG. 3.

When the vehicle is empty or not loaded sufficiently for causing the lever 23 to depress the valve stem 4, the latter is in its upper end position shown in FIG. 2, in which the servomotor is vented to atmosphere through the control valve and the brake is set for the lower braking effort. Compressed air of a pressure exceeding the atmospheric by say 5 kg./cm.$^2$ (which is the normal service pressure in compressed air brakes) is present in the port 3 and in the space accommodating the valve member 15 and closed at its lower end by the diaphragm 13. The compressed air pressure is acting on the valve member 15 upwardly by a force definable as the product of the compressed air pressure and the pressure area circumscribed by the annular edge or ridge 17, and downwardly by a force definable as the product of the compressed air pressure and the effective pressure area of the diaphragm 13. These two opposing forces are of the same order of magnitude, so that the force urging the valve member 15 up against the projecting annular edge or ridge 17 is substantially that of the spring 18. It is preferable, however, to select the said forces being exerted on the valve member 15 by the compressed air pressure so that they do not balance each other completely but give a small resultant acting in the same direction as the spring 18 on the valve member 15. The upper port 2 with which the servomotor is connected, communicates with atmosphere through clearance provided for between the enlarged lower portion 6 of the valve stem 4 and the inside of the hollow insert 7 and through the through-hole 16 in the valve member 15 and the restricted opening 14a in the bottom plug 14. The valve stem 4 is urged into its upper end position by the spring 9.

When the vehicle has been loaded sufficiently for causing the spring in the dash pot 24 to yield, the lever 23 begins to turn down onto the head 5 and exert pressure thereon. The initial resistance offered by the valve stem 4 to this pressure is substantially that exerted by the force of the spring 9. On yielding of the spring 9 sufficiently for permitting the valve stem 4 to be depressed to the extent required for engaging the projecting edge or ridge 8 of the enlarged portion 6 with the upper end face of the valve member 15 for shutting off the servomotor from its aforesaid communication with atmosphere, the resistance to the further depression of the valve stem 4 by the lever 23 is augmented by the force of the spring 18 adding itself to the resistance exerted by the spring 9. When this augmented resistance is overcome by the pressure exerted by the lever 23 on the valve stem 4, the valve member 15 is depressed and losses its sealing contact with the projecting edge or ridge 17, and compressed air flows through the clearance between the enlarged valve stem portion 6 and the insert 7 into the space closed at its upper end by the diaphragm 12 and through the port 2 to the servomotor which consequently sets the brake for the higher braking effort. In the course of this operation of the control valve the movable system 4, 5, 6 and 15 thereof is subject to the following changes in the forces acting thereon.

The effivective pressure area of the diaphragm 13 and consequently also the downwardly directed force exerted on the movable system 4, 5, 6 and 15 by the compressed air remains substantially unchanged, while a change occurs in the upwardly directed force of the compressed air on this system. This change consists of a reduction of said upwardly directed force and occurs when the valve member 15 is depressed and losses its sealing contact with the projecting edge or ridge 17 and gives the compressed air access to the space around the portion of the valve stem 4 within the insert 7 closed at its upper end by the diaphragm 12. In order that the depression of the valve member 15 from its sealing contact with the edge or ridge 17 shall result in a reduction of the upwardly directed force on the movable system 4, 5, 6 and 15 of the control valve and a corresponding increase of the downwardly directed resultant of all the forces acting on this system, the diameter of the effective pressure area of the diaphragm 12 must be smaller than the diameter of the annular edge or ridge 17. On this condition the depression of the valve member 15 from its sealing contact with the ridge 17 will result in such a change in the equilibrium pressure of the valve operating lever 23 on the valve stem 4 that the latter will be moved down into its lower end position shown in FIG. 3 by the lever 23 even in the absence of a further increase of the pressure being exerted by the lever on the valve stem.

An additional condition for this operation of the control valve is that the change in the actuation of the valve by the compressed air occurring at the depression of the valve member 15 from its sealing contact with the ridge 17 does not disturb the sealing contact between the valve member 15 and the projecting edge or ridge 8 of the valve stem portion 6. As already stated above with respect to the upper end position of the valve shown in FIG. 2, the diameter of the annular ridge 17 and the diameter of the effective pressure area of the diaphragm 13 should be of about the same magnitude. This implies that the force urging the valve member 15 against the ridge 17 is substantially that of the spring 18. Similarly with respect to the lower end position of the valve shown in FIG. 3: also the diameter of the annular ridge 8 and the diameter of the effective pressure area of the diaphragm 13 must be of about the same magnitude in order that the force of the spring 18 safely shall be sufficient for holding the valve member 15 sealingly engaged with the ridge 8. This in turn implies that the diameters of the annular ridges 17 and 8 must be rather nearly equal, which in turn implies that the enlarged lower portion 6 of the valve stem must have a rather close, though not sealing fit in the hollow insert 7. As will be understood from the following this condition is important also with respect to the shifting of the valve in the opposite direction into the upper end position on unloading of the vehicle, though when for the purpose of creating during the shifting of the valve into the upper end position a desired increase of the force urging the valve stem 4 into this position.

Assuming the vehicle to be loaded and the valve to be in the position shown in FIG. 3, when on unloading of the vehicle the load thereon has been reduced sufficiently for allowing the lever 23 to begin to turn upwardly under the action of the spring in the dash pot 24 (FIG. 1), the movable parts of the valve also move upwardly until the valve member 15 again sealingly engages the ridge 17 of the insert 7. Because the spring 18 then ceases to aid in the upward movement of the valve stem 4, this movement is interrupted for awhile. When the lever 23 moves further upwardly, the valve stem 4 will be moved along correspondingly. Consequently, from this stage of the movement only the forces acting on the valve stem 4 and the changes in these forces have to be taken into account.

From the beginning and until the ridge 8 of the valve stem portion 6 has been lifted from its sealing contact with the valve member 15 there is compressed air of full pressure in the space around the valve stem 4 in the insert 7, and in the servomotor communicating with this space. This air pressure acts on the valve stem 4 in two directions: downwardly on the pressure area circumscribed by the annular ridge 8 and diminished by the area of the stem 4 where engaged by the diaphragm 12, and upwardly on the effective pressure area of the diaphragm 12. When the ridge 8 loses its sealing contact with the valve member 15, the space within the upper portion of relatively reduced inner diameter of the insert 7 and the servomotor communicating with this space are vented to atmosphere through the through-hole 16 in the valve member 15 and the throttle hole 14a in the plug 14, and then the valve stem 4 will be subject practically only to the upwardly directed force of the spring 9. It is evident that the described venting of the servomotor to atmosphere through the valve results in an increase of the resulting upwardly directed force on the valve stem 4 on the condition that the diameter of the effective pressure area of the diaphragm 12 is less than the diameter of the annular ridge 8.

It follows that there are three conditions that have to be met with: the diameter of the effective pressure area of the diaphragm 12 must be less than the diameter of the annular edge 17, the diameter of the effective pressure area of the diaphragm 12 also must be less than the diameter of the annular edge 8, and the diameters of the two annular edges 17 and 8 must be rather nearly equal, which implies that the radial clearance between them must be relatively small. These conditions are compatible with one another, and thus it is positively possible to realize the invention and its chief object which is to control not only the filling of a fluid pressure operated servomotor but also the venting thereof to atmosphere by a three-way control valve shiftable into one or the other of two end positions under the influence of such an external controlling force on the valve as that exerted by the valve operating lever 23, and by the aid of such an internal actuation of the valve by the fluid pressure that this actuation during each shifting of the valve is changed so as to give rise to an increase of the force urging the valve into and then holding it in the position to which it is being shifted. This increase occurring during shifting of the valve from any one of its two end positions to the other has the effect of augmenting the resistance offered by the valve to movement thereof from any one of its two end positions. This implies that the valve will be held steadily enough in the position into which it has been shifted in response to the vehicle load reposing on the vehicle springs for not easily being disturbed in its intended operation by the dynamic fluctuations of the pressure being exerted on the springs of the vehicle during running when the load of the vehicle is near to the load range above or below which the load of the vehicle on loading or unloading thereof has to be increased or decreased for intentional shifting of the valve from one to the other of its two end positions.

The reason for making the outlet opening 14a for the compressed air from the valve in the form of a throttle opening is as follows. As soon as on unloading of the vehicle the edge 8 loses its sealing contact with the valve member 15, the compressed air temporarily distributes itself over the entire upper face of the valve member 15 so that the resulting downwardly directed air pressure on said face, together with the downwardly directed air pressure on the diaphragm 13, might be sufficient for depressing the valve member 15 against the action of the spring 18. This would result in compressed air again being admitted from the source thereof into the upper portion of the interior of the hollow insert 7, and the valve member 15 then would either flutter or remain depressed and allow escape of compressed air from the source thereof to atmosphere. This is prevented in a simple manner by the through-hole 16 being relatively wide and the outlet opening 14a relatively narrow, because this has the effect of causing the compressed air that at the shifting of the valve from its lower to its upper end position on the lifting of the edge 8 from its sealing contact with the valve member 15 flows to atmosphere, to distribute its action equally enough on the upper and lower end faces of the valve member 15 for eliminating the risk for this member fluttering.

What I claim and desire to secure by Letters Patent is:

1. A three-way valve for controlling a pressure fluid operated servomotor on a vehicle by admitting pressure fluid from a source thereof to the servomotor or venting the servomotor to atmosphere according as the vehicle is loaded above or unloaded below a certain significantly wide load range, comprising a valve housing having therein a space composed of two axially aligned substantially cylindrical portions of different diameters and walled by circumferential walls, end walls and a wall portion ledging said space into said portions of different diameters and forming an annular valve seat, the portion of relatively enlarged diameter of said space having in its circumferential wall a port to be connected with the source of pressure fluid, the portion of relatively reduced diameter of said space having in its circumferential wall a port to be connected with the servomotor, a first valve member which is disposed in the portion of relatively enlarged diameter of said space and is axially movable therein between two end positions and is spring pressed toward one of them and, when in said one end position, engages said annular valve seat, shuts off said ports from communication with one another through said space and vents the portion of relatively reduced diameter of said space to atmosphere through a passage provided in said first valve member, a second valve member which is disposed in the portion of relatively reduced diameter of said space and is axially movable therein between two end positions and is spring pressed toward one of them in the direction of the spring pressure on said first valve member and, when in the other end position, engages said first valve member, shuts of said venting passage therein and holds said first valve member in its other end position off from said annular seat and admits flow of pressure fluid through said space from the port to be connected with the source of pressure fluid to the port to be connected with the servomotor, said end walls of said space comprising two flexible diaphragms clamped at their peripheries to the circumferential walls of said space at the two ends thereof and centrally engaged each with one of said valve members, and said second valve member having a projecting stem guided in the valve housing and adapted to be externally acted upon by vehicle load sensing means for moving said valve members into their said other end positions against the spring pressures thereon when the vehicle is loaded above said certain load range.

2. A three-way valve as claimed in claim 1, said annular valve seat being in the shape of a circular projecting edge, said second valve member being formed for its coaction with said first valve member with a circular projecting edge, said circular projecting edges being of diameters nearly the same as that of the portion of relatively reduced diameter of said space, the effective pressure area formed by the diaphragm engaged with said first valve member being about equal to the area circumscribed by said circular edge forming said annular valve seat, and the effective pressure area formed by the diaphragm engaged with said second valve member being less than the area circumscribed by said circular projecting edge on said second valve member.

3. A three-way valve as claimed in claim 1, and a cylindrical hollow insert inserted in said valve housing through one end thereof and forming the circumferential walls of said space and the wall portion ledging said space into said portions of different diameters, a bottom plug inserted in said valve housing through said one end thereof and holding said insert in place, the diaphragm engaged with said first valve member being clamped at its periphery between said bottom plug and said insert, and the diaphragm engaged with said second valve member being clamped at its periphery between said housing and said insert.

4. A three-way valve as claimed in claim 3, said bottom plug having a throttle hole for providing communication between the venting passage in said first valve member and atmosphere.

References Cited in the file of this patent
UNITED STATES PATENTS

| | | |
|---|---|---|
| 2,169,629 | Browall | Aug. 15, 1939 |
| 2,424,913 | Browall | July 29, 1947 |
| 2,500,450 | Carleton | Mar. 14, 1950 |